April 13, 1937. A. G. HENRICKS 2,077,238
APPARATUS FOR HANDLING AND STORING
Filed Aug. 22, 1927  6 Sheets-Sheet 2

INVENTOR.
ARTHUR G. HENRICKS
BY
ATTORNEYS.

Patented Apr. 13, 1937

2,077,238

UNITED STATES PATENT OFFICE 2,077,238

APPARATUS FOR HANDLING AND STORING

Arthur G. Henricks, Milwaukee, Wis., assignor to Harnischfeger Corporation, Milwaukee, Wis., a corporation of Wisconsin Application August 22, 1927, Serial No. 214,617

14 Claims. (Cl. 214—16.1)

This invention relates to an apparatus for storing and handling motor vehicles such as automobiles, or the like, although also adapted for advantageous use in handling various other diverse articles and materials.

An object of the invention is to provide an apparatus of this character adapted to be employed in a building devoted to the storage and housing of motor vehicles and which so mechanically handles and stores the vehicles as to economically and completely utilize the floor space of the building to best advantage, the necessity for providing spaces upon the several floors for the turning and backing of the vehicles being avoided.

Another object of the invention is to provide an apparatus of this character which handles the vehicles with power other than that of the vehicle itself and with promptness and dispatch and without possibility of confusion or liability of damage to the vehicle or to the apparatus.

Another object of the invention is to provide an apparatus of this character which is adapted for use with vehicles generally and with various makes and types of automobiles, or the like.

In carrying out the invention a garage building is provided which has a suitable number of floors and where several floors are provided as will usually be the case then elevators are also provided to carry the automobiles from the ground floor to the various floors. The ground floor is utilized principally as a receiving station for the automobiles. The upper floors, that is, each floor above the ground level, has a trackway extending along the same and a row of compartments or stalls on each side of the trackway. At least one and usually three or more compartments or stalls of each floor are utilized for the elevator shafts but the remainder of the compartments or stalls have runways which are designed to receive the wheels of an automobile. In each trackway a transfer platform or traveling bridge is provided and runs along the rails of the trackway. The transfer platforms have runways which are adapted to receive the wheels of an automobile and the elevators have similar runways. By alining a transfer platform with an elevator, an automobile may be run from the runway on the elevator onto the runway of the transfer platform. The transfer platform is then shifted until it is in position where it lines up with the stall in which the automobile is to be stored and then the automobile is shifted into its compartment or stall, the wheels of the automobile running from the runway of the transfer platform into the runway of the stall or compartment. On each transfer platform a suitable transferring device is provided and may comprise a dolly or transfer carriage and jack adapted for the purpose of shifting the automobile on and off the transfer platform, the transfer platform, the elevator and the stalls all having rails on which this transfer carriage may run. The transfer platform and the transfer carriage and jack have their individual electric motors, whereby they may be driven.

The controls for the motor for the transfer platform and for the motor of the carriage are interlocked whereby to preclude the transfer platform from being moved at any time except when the carriage is centered or substantially centered thereon and to prevent the carriage from being moved at all times except when the transfer platform is locked in alinement with the selected stall or elevator. In order to minimize the liability of the carriage being run into an empty elevator shaft or into a compartment which already contains a car, provision is made for requiring the operator to exercise deliberate and conscious control of the carriage when the carriage is shifted off of the transfer platform. In other words it is necessary for the operator to bring his attention to the carriage and its movements at this time.

In addition to the interlocked control for the motors a semi-automatic control is provided for the motor of the transfer platform whereby the transfer platform is automatically stopped in alinement with the selected stall or in alinement with the elevator shaft.

While substantial alinement is thus automatically insured, a final alinement or final matching between the carriage and the rails of the compartment or elevator is effected by means of cooperating matching or alining devices on the carriage and the transfer platform.

The carriage has a novel form of jack or hoist for the automobile whereby the automobile is interconnected with and controlled by the carriage. This jack or hoist consists of a pair of lift bars or other suitable lift members engageable under the front axle of the automobile and alternately raised and lowered, in a novel and effective manner and without the aid of reversing switches, reversing limit switches, or the like, from an electric motor which normally runs in the same direction but which may be reversed under abnormal or emergency conditions.

Apart from the other instrumentalities the transfer platform, the transfer carriage or dolly and its jack, together with their novel operating and controlling mechanisms, are capable of advantageous use in many diverse instances. One example of such a use is the handling of lumber, the lumber being stacked or piled on suitable tables designed to be engaged by the lift bars of the jack and transported and deposited under the control of the transfer platform and carriage.

Other objects and advantages reside in certain novel features of the construction, arrangement and combination of parts which will be hereinafter more fully described and particularly pointed out in the appended claims, reference being had to the accompanying drawings forming a part of this specification, and in which:

Referring to the drawings it will be seen that the present invention in its application to apparatus for storing and handling vehicles proposes a suitable garage building which may be of skeleton construction having suitable outer walls and a plurality of floors consisting simply of girders or beams supported on columns and on the walls. The building need not have any load supporting floor structure although fire proof partitions may be and preferably are provided between the floors, such partitions also having portions serving as drip pans.

Figure 3:
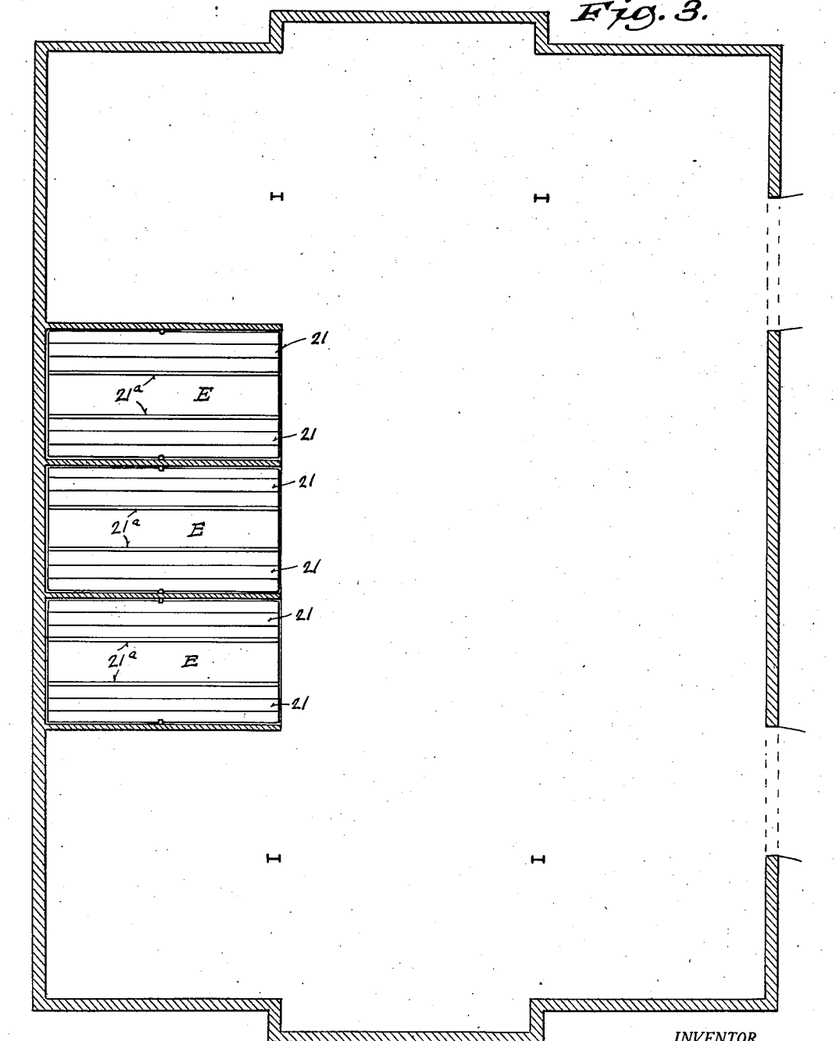
Figure 3 is a plan view of the ground floor.

The ground floor is used principally as a receiving station for the cars and affords the floor space necessary to facilitate their entrance upon the elevators, as shown in Figure 3.

Figure 1:
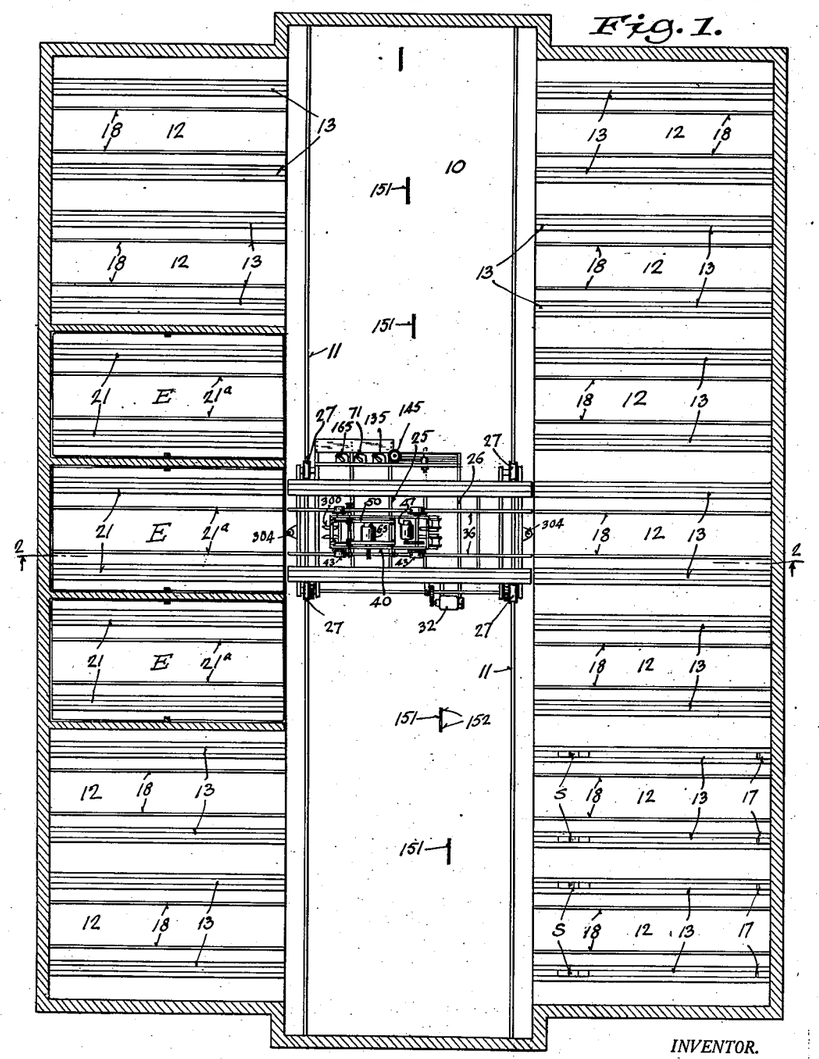
Figure 1 is a plan view of one of the upper floors, the walls of the building being shown in section.
Figure 2:
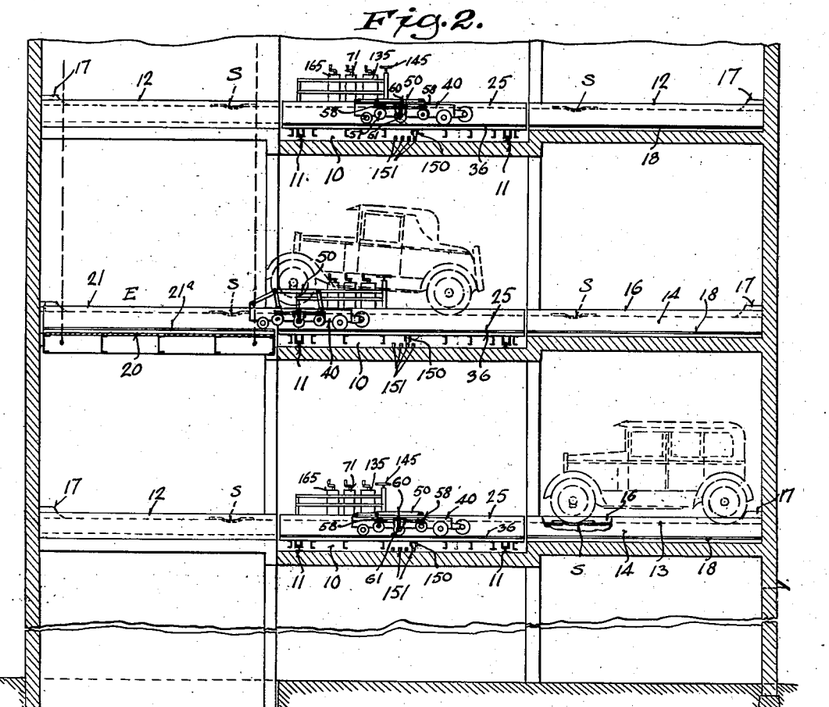
Figure 2 is a fragmentary view in vertical section on line 2—2 of Figure 1.

As shown in Figure 1, each of the floors above the ground floor preferably has a centrally disposed and longitudinally extending aisle 10 in which the rails 11 of a trackway are mounted. Along each side of the trackway a row of stalls 12 are provided. Each stall 12 has a pair of guideways or runways 13 adapted to receive the wheels of an automobile or similar vehicle, the runways having suitably constructed or built up elongated base 14 with a groove or way 16 along its upper portion, the groove or way 16 being of a curved cross-section adapting it to receive and support the tires of an automobile wheel. The runways of each stall are spaced apart to correspond with the wheel spacing of the automobile which they are designed to receive. The stalls are closely positioned without intermediate lost or idle space, this economy being made possible by virtue of the fact that the cars are handled by power other than that of the car itself thereby avoiding the necessity of an operator getting into or out of a car in a stall. The runways of each stall may incline inwardly and downwardly so that a vehicle deposited in the runways will remain therein under the action of gravity, but in lieu of this expedient or in addition thereto, recessed wheel receiving stops S may be built into the grooves or ways 16 of the runways (see Fig. 2). Where desirable wheel buffers or bumpers 17 may be positioned at the inner end of each stall. A pair of rails 18 is positioned in between the guideways of each stall and provide a trackway for a purpose to be hereinafter described.

The building is provided with a suitable number of elevators E for carrying the automobiles from the ground level or floor to any upper floor and the shafts for the elevators extend through spaces provided through the rows of stalls. It is to be understood that the number of elevators provided may be varied to meet the requirements. Each elevator has a platform 20 on which a pair of runways 21 is mounted, the runways 21 corresponding to the runways 13. Rails 21ª are positioned intermediate the runways 21 and correspond to the rails 18 of the stalls 12.

In each aisle 10 a transfer platform or bridge 25 is provided and comprises a suitable frame or body structure 26 on which flanged wheels 27 are rotatably mounted, the wheels 27 running on the rails 11 of the aisle (see Figs. 1, 4, 5 and 6). For the purpose of driving the transfer platform back and forth on its trackway gear wheels 28 are fixed to rotate with one pair of supporting wheels 27 and these gear wheels 28 mesh with pinions 29 fixed to a shaft 30 geared as at 31 to the armature shaft 32ª of an electric motor 32. At the other end of the armature shaft 32ª an electromagnetic brake 33 of conventional construction is provided and is designed and operated in the usual manner so as to be released electromagnetically when the motor is operating but set automatically by the usual spring means when the motor is stopped.

Figures 6, 7:
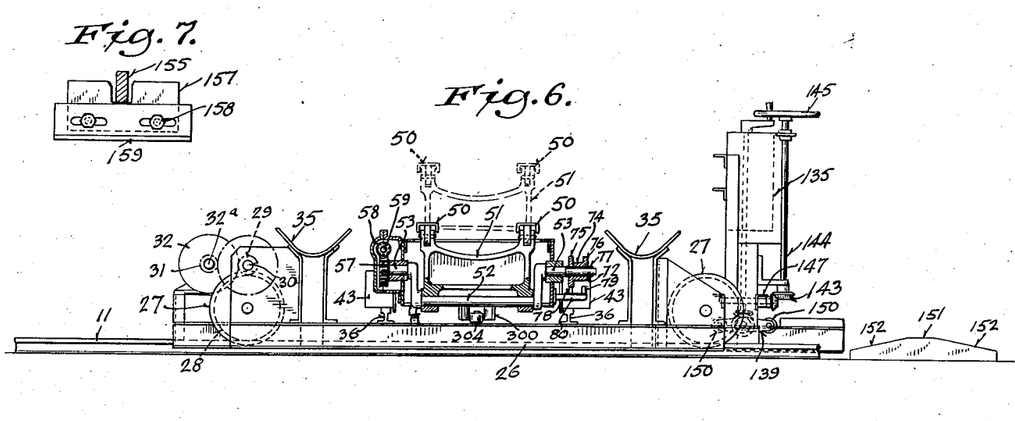
Figure 6 is a view thereof in end elevation, parts of the carriage being shown in transverse vertical section for the sake of illustration.
Figure 7 is a sectional view on line 7—7 of Figure 5.

On each transfer platform a pair of guideways or runways 35 is provided, the runways 35 being exactly like the runways 13 and 21 and extending transversely across the platform 26 for the full width thereof. Figure 6 illustrates one way of constructing these runways 35, 21 and 13. In between the runways 35 rails 36 are provided and constitute a trackway adapted to be alined with the trackways of the elevators or stalls.

On each transfer platform a transfer carriage or dolly or other suitable transferring device 40 is provided and consists of a suitable frame 41 having axles 42 on which flanged wheels 43 are mounted, the wheels 43 running on the rails 36. For driving the carriage back and forth one of the axles 42 has a gear wheel 44 fixed thereto, the gear wheel 44 meshing with the pinion 45 fixed to one end of the armature shaft 46 of an electric motor 47 (see Figs. 4 and 8) suitably supported on the frame 41 of the carriage. The other end of the armature shaft 46 has an electromagnetic brake 48 associated therewith and this electromagnetic brake 48 is of conventional construction, it being designed to be automatically released by an electromagnet when the motor 47 is running and yet being automatically set by a spring when the electric motor 47 is stopped.

Figures 4, 10:
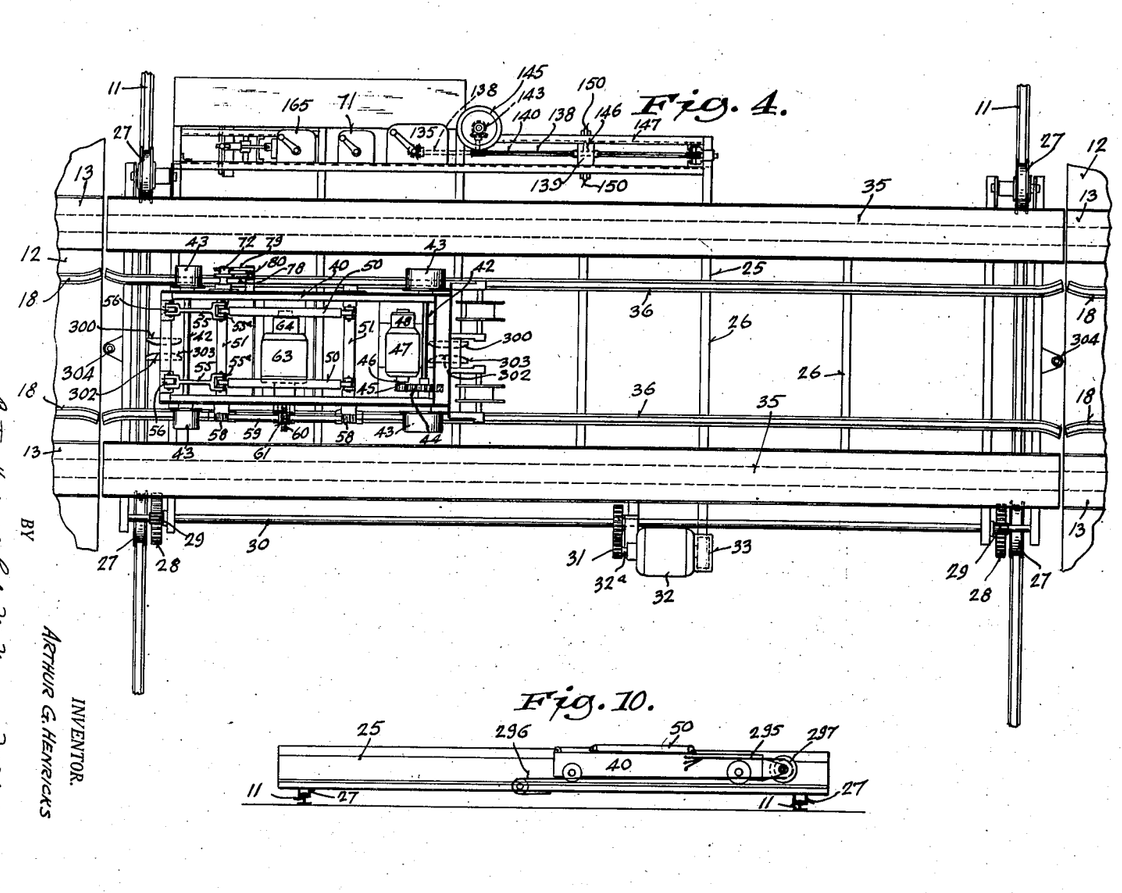
Figure 4 is a fragmentary plan view showing the traveling platform, the traveling carriage and associated instrumentalities.
Figure 10 is a diagrammatic view illustrating the manner in which the cables are associated with the platform and carriage.
Figure 8:
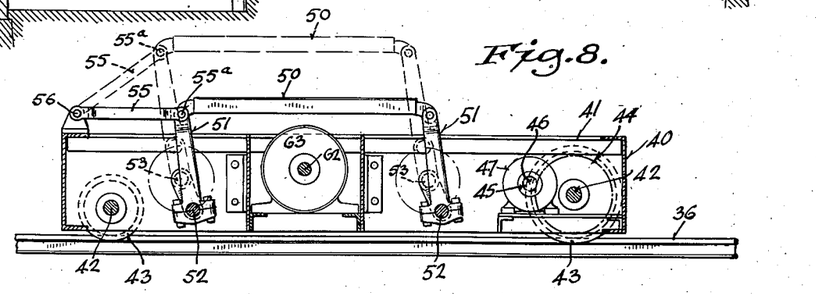
Figure 8 is a detail view of the carriage, parts being shown in side elevation and parts being shown in vertical section for the sake of illustration.

Each carriage has a jack or hoist arrangement associated therewith and made up of a pair of lift bars 50 which may be constructed of metal and covered with leather or other suitable cushioning material and which are pivotally mounted at the upper ends of link frame 51, the lower ends of the link frames 51 being pivotally mounted on crank shafts 52 having trunnions 53 journaled in bearings provided therefor in the side members of the frame 41 (see Figs. 4, 6 and 8). The bars or tie links 55 are pivotally connected to the bars 50 and the link frames 51 at the adjacent pivotal connections of these parts as indicated at 55a, the tie bars also being pivotally mounted as at 56 on the adjacent end of the frame 41. These tie bars constrain the lift bars to up and down movement in a vertical plane.

For the purpose of rotating the crank shafts 52 to raise and lower the lift bars 50, one trunnion 53 of each crank shaft 52 has a worm wheel 57 fixed thereto, the worm wheels 57 meshing with worms 58 fixed on a worm shaft 59. The worm shaft 59 also has a worm wheel 60 fixed thereon and meshing with a worm 61 fixed on one end of an armature shaft 62 of an electric motor 63 supported on frame 41 as shown in Figure 8. The opposite ends of the armature shaft 62 of the motor 63 is equipped with an electromagnetic brake 64 similar to the electromagnetic brake 48. With this arrangement the motor 63 may be of simple type of electric motor (such as a series wound direct current motor) which, under normal conditions, constantly turns in the same direction and yet effects alternate raising and lowering of the lift bars.

An important advantage of the jack construction resides in the fact that the motor, during the lifting operation, may and does acquire considerable torque before it is subjected to the load, since during the first phases of the movement of the crank shaft the vertical component of their motion is slight and consequently their lift is slight. Moreover, the lift bars do not engage the automobile until moved upwardly slightly. These lift bars 50 are designed to engage under the front axle of an automobile when they are elevated and by virtue of such engagement to lift the front end of the automobile to an extent sufficient to interconnect it with the carriage and provide for its control by the carriage. In other words, the weight of the automobile is taken partly by the bars 50 and partly by the rear wheels of the automobile, the front wheels being lifted up above the runways.

The jack itself possesses inherent features of safety in that even though the motor or other actuating means therefor run uncontrolled or over a longer period than intended, the jack cannot and will not become stuck or jammed or otherwise injured but would merely raise and lower slowly and smoothly. And the jack is not capable of injuring its associated parts or the articles with which it coacts even though the jack be improperly operated.

The armature of the electric motor 63, under normal conditions, turns in the same direction to effect alternate raising and lowering of the lift bars 50. This motion of the armature shaft 62 is initiated under the manual control of the operator, but the armature shaft is stopped automatically at the end of a raising or lowering movement. In order to provide for this operation of the jack the motor circuit of the electric motor 63 has a contactor designated generally at 70, a controller designated generally at 71, and a limit switch designated generally at 72 organized therewith, as shown in Figure 9.

Figure 9:
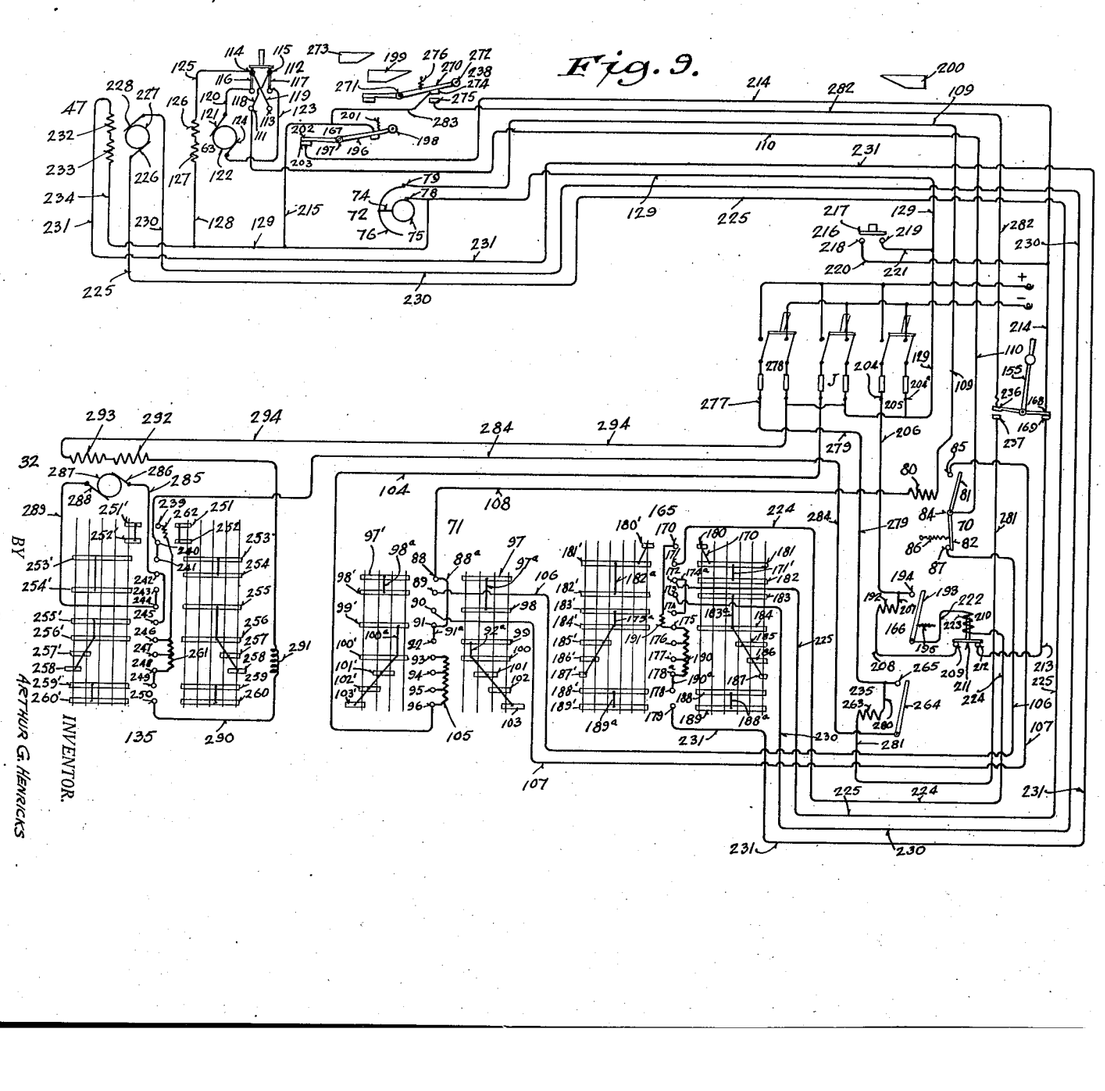
Figure 9 is a diagrammatic view showing one method of wiring and organizing the various controls of the motors.

As shown in Figures 4, 6 and 9, the limit switch 72 preferably comprises a mutilated slip ring assembly made up of a hub 74, a full ring 75 and a mutilated or half ring 76, the hub 74 being mounted on and secured to one of the trunnions 53 of one of the crank shafts 52 but being electrically insulated from its trunnion 53 by means of an insulating sleeve 77. The hub 74 and rings 75 and 76 are of conductive material. Spring fingers 78 and 79 are carried by a bracket 80 mounted on the frame of the carriage and bearing against the rings 75 and 76, respectively (see Figs. 4 and 9).

The contactor 70 includes a contact coil 80 and arms 81 and 82 rigidly connected to each other and pivoted as at 84. The coil 80 when energized draws the arm 81 to it and causes the arm 81 to engage a contact 85. When the coil 80 is de-energized a spring 86 pulls the arm 82 into engagement with a contact 87 and simultaneously disengages the arm 81 from the contact 85.

The controller 71 has two "on" positions in either of which the motor 63 is, under normal conditions, rotated in the same direction. As shown, the controller has contacts 88, 89, 90, 91, 92, 93, 94, 95 and 96, and two sets of segments designated at 97, 98, 99, 100, 101, 102, 103, and 97', 98', 99', 100', 101', 102', and 103', respectively, one set of segments being engaged with the contacts in one "on" position of the controller and the other set of segments being engaged with the contacts in the other "on" position of the controller.

A wire 104 which connects with the positive pole of a knife switch J leads to the contact 96 of the controller, this contact 96 being electrically connected with one end of the controller resistance 105. Wires 106 and 107 are electrically connected with the contacts 89 and 90, respectively, the wire 106 leading to the contact 87 of the contactor 70, while the wire 107 leads to the contact 85 thereof. One terminal of the contactor coil 80 is connected by a wire 108 with the contact 88 of the controller and the other terminal of this coil 80 connects by a wire 109 with the spring finger 79 of the limit switch 72. The arms 81 and 82 of the contactor 70 are connected by a wire 110 to one contact 111 of a reversing switch designated generally at 112. This reversing switch 112 has a companion contact 113 for the contact 111 and also has a set of contacts 114 and 115 and switch arms 116 and 117 designed to engage the contacts 114 and 115 or the contacts 111 and 113. A cross wire 118 connects the contacts 111 and 115 and a similar wire 119 connects the contacts 113 and 114. The arm 116 is connected by a wire 120 with a brush 121 of the armature 122 of the electric motor 63 and the arm 117 is similarly connected by a wire 123 with a brush 124. The contact 114 connects by a wire 125 with the field 126. A coil 127 of the electromagnetic brake 64 is connected in series with the field 126 and connects by a wire 128 with a common return wire 129 which leads back to the negative pole of the knife switch J which connects with the source of current. The contact finger 78 of the limit switch 72 also connects with the common return wire 129.

With the limit switch 72 positioned as shown in Figure 9, current flows through the wire 104 to the contact 96, resistance 105 and contact 93 of the controller. The controller is then turned to the "on" position in which the segments 97, 98, 99 and 100 engage their respective contacts 88, 90, 92 and 93. This permits the current to flow from the contact 93 through the segment 100, wire 92ª connecting segment 100 with segment 99, through segment 99, contact 92, wire 91ª connecting contacts 92 and 91, contact 91, wire 88ª connecting contacts 91 and 88, wire 108 to the coil 80 of the contactor 70, through the coil to the wire 109, and thence to the contact finger 79 of the limit switch 72. The current flows through the half ring 76, hub 74, and full ring 75 of the limit switch to the spring finger 78 and passes from the spring finger 78 to the common return wire 129, through which it flows back to the negative source of current. In this way the coil 80 is energized and the arm 81 is pulled into engagement with the contact 85. Engagement of contacts 81 and 85 completes the motor circuit of the electric motor 63 with the control in the "on" position wherein the segments 97 to 103 are engaged with their respective contacts, the current at this time flowing through the following path. The current flows through the wire 104 to the contact 96, resistance 105 and contact 93 of the control and passes from the contact 93 to the segment 100, thence through the wire 92ª, segment 99, and contact 92, to the wire 91ª, through the wire 91ª, contact 91, and wire 88ª, to the contact 88. Here the current divides, part passing on through the coil 80, as previously described, and part passing over to the segment 97, and down through the wire 97ª to the segment 98 which engages the contact 90 to permit the current to flow to this contact and on through the wire 107 to the contact 85 of the contactor. The current then flows through the arm 81 and wire 110 to the contact 111 of the reversing switch. Leaving contact 111 the current passes through the wire 118, contact 115, arm 117, wire 123, to the brush 124, thence through the armature of the motor and out through the brush 121, wire 120, arm 116, contact 114, wire 125, to the field 126. The current traverses the field 126 and then passes through the brake coil 127, and the wire 128 to the common return wire 129. This starts up the motor and the motor continues to move until the half ring 76 moves out of engagement with the spring finger 79. Disengagement of the half ring 76 and spring finger 79 breaks the current through the coil 80 thereby deenergizing the coil and permitting the spring 86 to disengage the arm 81 from the contact 85 of the contactor thereby breaking the motor circuit for the electric motor 63. This has, however, engaged the arm 82 with the contact 87 so that the motor circuit may be completed to continue the rotation of the armature in the same direction by turning the controller to its other "on" position wherein the segments 97' to 103' are engaged with their respective contacts 88 to 96. With the controller so positioned and the arm 82 engaged with the contact 87 the current flows through the wire 104 to the contact 96, resistance 105 and contact 93 of the controller, and thence passes over to the segment 100', through a wire 100ª to the segment 99' and to the contact 91 engaged therewith. From the contact 91 the current passes through wire 88ª to the contact 88 and thence over to the segment 97' engaged therewith. A wire 98ª connects the segment 97' with the segment 98' and the current flows through this wire 98ª to the segment 98' and to the contact 89 engaged therewith. Leaving the contact 89 the current passes through a wire 106 to the contact 87 of the contactor and thence through arm 82 and the wire 110 to the contact 111 of the reversing switch, from whence it flows through the armature 122, field 126, brake coil 127, wire 128 and common return wire 129 as before. This operation continues until the half ring 76 again comes into engagement with the spring finger 79 whereupon the coil 80 is energized to disengage the arm 82 from the contact 87 of the contactor. This breaks the motor circuit for the electric motor 63 but it engages the arm 81 with the contact 85 so that upon shifting the controller 71 to its other "on" position the motor circuit may be again made in the manner first described.

The limit switch 72 is designed to permit half revolutions of the crank shafts 52 each time the controller is thrown to the proper "on" position. This permits alternate raising and lowering movement of the lift bars and while these raising and lowering movements are started under the manual control of the operator they are automatically terminated by the limit switch 72. In the operation of the jack the reversing switch is left in the position shown in Figure 9 and it is not employed except in an emergency, that is, when it is desirable for one reason or another to interrupt the normal operation and cause the lift bars which have been partially raised to descend or lower before completing the upward movement.

In handling automobiles these lift bars are designed to engage under the front axle and if, under unusual circumstances, the carriage is incorrectly positioned with respect to the automobile and the operator starts the elevation of the lift bars before he detects their improper positioning, he can throw the controller to "off" position, throw the reversing switch 112, and then lower the lift bars. It is not often that the reversing switch will be employed, and in fact, under many circumstances it can be omitted entirely.

A controller designated at 135 is provided for the motor 32 which propels the transfer platform back and further along the aisle. This controller has the usual controller handle whereby it may be turned to either of its "on" positions, but it is proposed to automatically turn the controller off when the transfer platform is alined with a pre-selected stall, elevator, or the like.

In carrying out this purpose the lower end of the usual controller shaft 136 is geared as at 137 to a rock shaft 138 extending transversely of the platform. A rockable lever 139 is mounted on the shaft 138 so as to be axially adjustable therealong but constrained to rotate with the shaft 138. Means is provided for shifting the lever 139 along the shaft 138 and this means consists of a chain or flexible element 140 having its ends connected to the lever and having its intermediate portions trained around wheels or pulleys 141 and 142 rotatably mounted on the platform. The shaft on which the wheel 141 is fixed is geared as at 143 to a vertical shaft 144 which may be adjusted by a hand wheel 145. A pointer 146 is provided on the central portion of the lever 139 and coacts with a dial or scale provided on a bar 147 paralleling the chain 140. This dial or bar 147 has indicia thereon which coacts with the pointer 146 to facilitate pre-selection of the stall or elevator at which the platform is to be stopped.

At its ends the lever 139 is provided with rollers 150 designed to coact with track abutments 151 provided in the aisle. The track abutments 151 are fixed to the aisle or trackway and are staggered or spaced transversely and longitudinally of the trackway. One such track abutment is provided for each stall and for each elevator shaft. Each track abutment has a cam or incline 152.

With this arrangement the operator pre-selects the stall or elevator at which the platform is to be stopped by turning the hand wheel 145 until the pointer 146 registers with the indicia of the stall designating the selected stall or elevator shaft in which position of the pointer the lever 139 is positioned to be engageable with the track abutment of the selected stall or elevator shaft and then when the operator turns the controller to its "on" position the lever 139, which is horizontal in the "off" position of the controller, is tilted one way or the other depending upon how the controller handle is turned. However, when the platform reaches the proximity of the selected stall its lower roller 150 engages the cam or incline 152 of the selected track abutment whereby the lever 139 is slowly rocked to a horizontal position and the controller is slowly turned to the "off" position from the lever, the motion of the lever being transmitted to the controller shaft 136 through the shaft 138 and gearing 137.

Releasable means is provided for locking or mechanically securing the transfer platform in substantial alinement with the selected stall or elevator and this means preferably comprises a bell crank locking lever 155 fulcrumed as at 156 on the frame of the platform and selectively cooperable with the notched keeper plates 157 adjustably mounted as at 158 on an angle 159 extending lengthwise of the trackway. One such notched keeper plate is provided for each stall and each elevator shaft. When the locking lever 155 is engaged with any one of the notched keeper plates it is swung to the left as viewed in Figure 5. Disengagement of the locking lever from its keeper plate is accomplished by swinging the locking lever 155 to the right or in a clockwise direction as viewed in Figure 5. The locking lever is manually manipulated, its upper end being fashioned to provide a handle 160, but this locking lever is releasably held in either position by the action of a weight 161 provided on the handle 160 and biasing the lever to either extreme positions when the lever is swung past neutral or dead center position.

Figure 5:
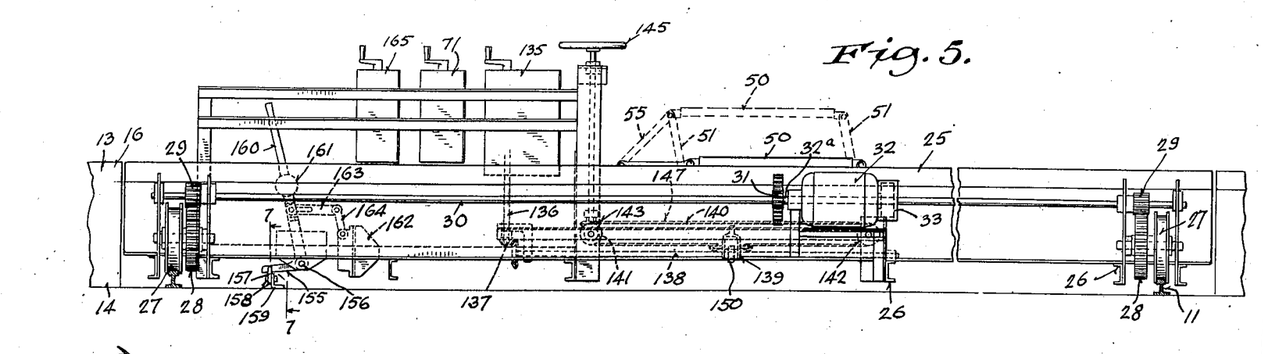
Figure 5 is a view in side elevation of the parts shown in Figure 4.

This mechanical lock is utilized to control an interlock between the motor circuits provided for the electric motors 32 and 47, this interlock being of such character that the motor circuits for the electric motor 32 may be completed only when the motor circuit for the electric motor 47 is broken and vice versa, as will hereinafter more clearly appear. In carrying out this arrangement an interlocking switch arrangement between the motor circuits is provided and is designated generally at 162, this interlocking switch arrangement being controlled from the lever 155, by means of the link 163 and a lever 164, as illustrated in Figure 5. The action of this interlocking switch arrangement is more clearly illustrated diagrammatically in Figure 9 and will be hereafter more fully described.

When the transfer platform is substantially alined with any stall or elevator and locked in such position by the lever 155 the carriage or dolly may be run off of the platform and into the stall or onto the elevator but the traveling platform itself may not be moved at this time. For the purpose of controlling the movements of the carriage the motor circuit for the carriage motor 47 has a controller designated generally at 165, a contactor designated generally at 166, and a limit switch designated generally at 167, organized therewith. In addition, the motor circuit has incorporated therein, a set of contacts designated generally at 168 and 169, these contacts 168 and 169 constituting elements of the interlock 162 as will more clearly appear.

The controller 165 has two "on" positions, one for causing rotation of the armature of the motor 45 in one direction, and the other for causing the reverse rotation of the motor, thereby providing for the movements of the carriage onto and off of the traveling platform. To this end the controller has a set of contacts designated generally at 170, 171, 172, 173, 174, 175, 176, 177, 178, 178ᵃ and 179, and two sets of segments cooperable with the contacts, one set of segments being designated generally at 180, 181, 182, 183, 184, 185, 186, 187, 188 and 189, and the other set of segments being designated at 180', 181', 182', 183', 184', 185', 186', 187', 188' and 189'. The controller resistance is designated at 190 and a resistance of the conventional armature shunt at 191.

The contactor 166 is of conventional construction and has a contactor coil 192 and an arm 193 influenced by the coil and engageable with a contact 194 when pulled over by the coil against the action of its spring 195. Of course, in lieu of a spring the contactor arm may be biased to open position by the action of gravity.

The limit switch 167 comprises a lever 196 fulcrumed as at 197 on the carriage and having a roller 198 at one end of the lever engageable with cams 199 and 200 mounted on the platform and in the stalls or elevators. A spring 201 is associated with this lever 196 and tends to cause a contact 202 carried by the lever to engage a contact 203 mounted on the carriage. When the roller 198 engages either of its cooperable cams 199 or 200 the lever 196 is rocked to disengage the contacts 202 and 203.

The positive pole 204 of a knife switch 205 connecting with the source of current has a wire 206 connected therewith and leading to the contact 194. This contact 194 is connected by a wire 207 with one terminal of the coil 192. The other terminal of the coil 192 is connected by a wire 208 with a contact 209 of an overload relay designated at 210. A bridging contact member 211 is incorporated in this relay and engages the contact 209 and also a contact 212. A wire 213 leads from the contact 212 to the contact 169 of the interlock. The other contact 168 of the interlock has a wire 214 connected therewith and leading to the contact 203 of the limit switch 167. The contact 202 of this limit switch 167 connects by a wire 215 with the common return wire 129.

Figure 9 shows the limit switch 167 in the position which it assumes when the carriage is traveling or moving on the transfer platform or in a stall or elevator in intermediate positions. As explained, when the carriage moves to its extreme position into a stall or onto an elevator or when it is moved into its extreme or proper position on the transfer platform the cams coact with the roller 198 of the lever to rock the lever 196 of this limit switch and disengage the contacts 202 and 203. Thus, with the carriage properly positioned on the transfer platform it is necessary to short circuit the limit switch in order to energize the contactor coil 192 and this is provided for by a push button switch designated generally at 216 and having a push button 217 for bridging contacts 218 and 219 which connect by wires 220 and 221 to the wires 214 and 129 respectively. When it is desired to start movement of the carriage the push button 217 must be depressed to bridge the contacts 218 and 219 whereupon the current flows from the positive pole 204 of the switch 205, through the wires 206 and 207 to the coil 192, through the coil 192 and wire 208 to the over-load relay, through the contacts 209, 211 and 212 thereof to the wire 213 through which it flows to the contacts 168 and 169 of the interlock. Passing through these contacts 168 and 169 the current flows through the wire 214 to the wire 220, whence it passes through the contacts 218, 217 and 219 and the wire 221 to the common return wire 129. This energizes the contactor coil 192 whereby the arm 193 of the contactor is pulled over to engage the contact 194 thereby completing the motor circuit in the following manner: The current flows from the positive pole 204, through the wire 206, contact 194, and arm 193, to a wire 222 which leads to the coil 223 of the over-load relay. From this coil 223 the current passes to a wire 224 which leads to the contact 171 of the controller 165. The controller is turned in the direction which causes the segments 180 to 189 to engage the contacts 170 to 179 so that the current passes from the contact 171 over to the segment 181 and from this segment 181 it passes through wires 170' and 171' to the segments 180 and 182. As these segments 180 and 182 engage the contacts 170 and 172 part of the current passes from the contact 170 through the armature shunt in the usual manner and part of the current passes from the segment 182 over to the contact 172 and thence through the wire 225 which leads from this contact 172 to the brush 226 of the armature 227 of the motor 47. From the other brush 228 of the armature the current flows back through a wire 230 to the contact 173 of the controller and passes from this contact 173 over to the segment 183 and down through the wire 183ᵃ of the segment 184 and thence through the controller resistance 190 and wire 190ᵃ to the contact 178. From the contact 178 the current passes to the segment 188 and through the wire 188ᵃ to the segment 189. The segment 189 engages the contact 179 so that the current flows through this contact 179 and through a wire 231 connected therewith to the field 232 of the motor 47. As the current passes through the field it passes on to the coil 233 of the electromagnetic brake 48 of the motor 47 and then travels through a wire 234 back to the common return wire 129, which leads back to the negative pole 204ᵃ of the switch 205.

As soon as the carriage begins to move the roller 198 of the limit switch is disengaged from its cam thereby permitting the spring 201 to engage the contacts 202 and 203. As soon as this occurs the push button 217 may be released, for at that time, the path of the current through the contactor coil 192 may be completed from the wire 214 through the contacts 203 and 202 and wire 215 back to the common return wire 129. The use of a push button switch in this organization not only permits the employment of a simple yet effective means for limiting the movements of the carriage but it also makes it necessary for the operator to exercise a deliberate and conscious control of the movements of the carriage. In other words, if a careless operator were to leave the controller 165 in either "on" position nothing would happen until the push button 217 was depressed. This means of focusing the operator's attention on the movements of the carriage has important advantages because it precludes in a practical way any possibility of the carriage being run into an empty elevator shaft or of carrying an automobile into an already occupied stall.

In the other "on" position of the controller 165 the segments 180' to 189' coact with the contacts 170 to 179 in order to reverse the flow of current through the armature. In such position of the controller the current flows to the contacts 171 of the controller as before but passes over to the segment 181' where it divides, part of the current passing over to the contact 180' and through the armature shunt, and part of the current passing through a wire 182ᵃ down to the segment 182' and thence over to the contact 173 through the wire 230 to the brush 228. After traversing the armature the current flows through brush 226 and wire 225 back to the contact 172 of the controller and then passes down through a wire 174ᵃ to the contact 174. The segment 183' engages this contact 174, so that the current passes over to this segment 183' and down through a wire 175ᵃ to the segment 184' from whence it passes to the contact 175 and through the controller resistance 190 to the contact 178. The current then passes over to the segment 188' and down to the segment 189' through a wire 189ᵃ. From the segment 189' the current passes over to the contact 179 and thence through the wire 231, through the field 232 and brake coil 233 to the wire 234 and then on back through the return wire 129.

It is to be understood that the motor circuit for the motor 47 cannot be completed except when the contactor coil 192 is energized. The contactor coil 192 cannot be energized unless the contacts 168 and 169 are engaged. It is therefore a prerequisite to operation of the carriage that the platform be locked in position alined with a stall or with an elevator as the contacts 168 and 169 are not engaged unless the platform is so locked.

The motor circuit for the electric motor 32 which propels the platform back and forth has organized therewith the controller 135, a contactor designated generally at 235, a set of contacts 236 and 237 of the interlock 162 and a limit switch designated generally at 238. The controller 135 is very similar in its arrangement to the controller 165 and has the contacts 239 to 250 and two sets of segments cooperable with the contacts, one set of segments by the numerals 251 to 260 and the other set of segments being designated by the reference characters 251' to 260', inclusive, the controller also has a controller resistance 261 and a resistance 262 embodied in the usual armature shunt. As in the other instances the contactor comprises a coil 263 influencing a spring or gravity biased contact arm 264 which is engageable with a contact 265 when the coil 263 is energized. The limit switch 238 is provided to preclude operation of the motor 32 at any time except when the carriage is in proper position on the transfer platform and for this purpose this limit switch 238 comprises a lever 270 fulcrumed as at 271 and having a roller 272 engageable with a cam 273 mounted on the platform. When the roller 272 engages the cam 273 the carriage is properly positioned on the transfer platform and a contact 274 carried by the lever is engaged with a stationary contact 275, a spring 276 coacts with the lever to disengage the contacts 274 and 275 at all times except when the roller 272 is engaged with the cam 273. Assuming the locking lever 155 to be released and the carriage to be properly positioned on the transfer platform then the contacts 236 and 237 of the interlock 162 and the contacts 274 and 275 of the limit switch 238 will be engaged and the contactor coil 263 will be energized for the current will flow from the positive pole 277 of a knife switch 278 connected with the source of current, through a wire 279 to the contact 265. A wire 280 connects with this wire 279 and leads to one terminal of the coil 263. The other terminal of this coil 263 connects by a wire 281 with the contact 237. The current flows through the contacts 236 and 237 and through a wire 282 which leads from the contact 236 to the contact 275 of the limit switch 238. Passing through the engaged contacts 275 and 274 the current travels on through a wire 283 to the common return wire 129. The coil 263 is thus energized and attracts the arm 264 and causes this arm 264 to engage the contact 265.

The current then flows from the positive pole 277, through the wire 279 to the contact 265, thence through the arm 264 and through a wire 284 to the contacts 240 and 241 of the controller. Here the current divides, part passing from the contact 240 through the connected segments 252 and 251 over to the contact 239 and on through the armature shunt. The remainder of the current passes from the contact 241 over to the segment 253, thence down to the connected segment 254 and over to the contact 242. Leaving the contact 242 the current passes through a wire 285 which connects this contact with a brush 286, the current flowing on through the brush 286, the armature 287 of the electrical motor 32, the other brush 288 and a wire 289 which leads back to the contact 244. From the wire 244 the current passes over to the segment 255 and then down to the connected segment 256, through the controller resistance 261 to the contact 249. From the contact 249 the current passes over to the segment 259 and thence down to the connected segment 260 and across to the contact 250 engaged with the segment 260. Leaving the contact 250 the current passes on through a wire 290 which leads through a blow-out 291 to the field 292 and brake coil 293 of the motor 32. The brake coil connects with a wire 294 which leads back to the negative pole of the switch 278. In the other position of the controller the current flows to the contacts 240 and 241 as before but the part of the current which flows to the armature passes over to the segment 253' and down to the connected segment 254'. The segment 254' engages the contact 243 so that the current passes over to this contact 243 and down to the connected contact 244, and thence through the wire 289 to the brush 288. The current thus traverses the armature in a reverse direction and flows back through the brush 286 and wire 285 to the contact 242. The contact 242 connects with the contact 245 and the current thus flows down to the contact 245 and over to the segment 255', and thence down to the connected segment 256' over to contact 246 and through the controller resistance to the contact 249. The segments 259' and 260' convey the current to the contact 250 from whence it flows through the field and brake coil and back to the negative pole of the switch as before.

It is to be understood that the method of wiring illustrated is shown for the purpose of illustration only and various changes, additions, and omissions are contemplated within the spirit of the invention and the scope of the subjoined claims.

From the foregoing it will be understood that the traveling or transfer platform is started to move in one direction or the other by proper manipulation of the controller 135. The movement of this traveling or transfer platform is stopped automatically by the coaction of the depressed roller of the lever 139 with the cam 151 with which the lever has been alined. The carriage is started off of the transfer platform by properly manipulating the controller 165 and depressing the push button 217 but it is automatically stopped by the action of the limit switch 167. The movement of the carriage back and onto the transfer platform is started by reversely actuating the controller and pressing the push button 217, and when the carriage has reached the proper position on the traveling platform its motion is arrested under the control of the limit switch 167. In connection with the operation of the carriage and the traveling platform it is important to note that due to the action of the limit switch 238 the traveling platform can never be started into motion unless the carriage is properly centered thereon. Even if the carriage is properly centered thereon the traveling platform may not be started when it is locked in alinement with the stall or elevator because when so locked the contacts 236 and 237 are disengaged and engagement of these contacts is essential to completion of the motor circuit for the motor 32, which operates the traveling platform. On the other hand, the carriage may not be moved off of the traveling platform unless the traveling platform is mechanically locked in alinement with an elevator or a compartment, because until the traveling platform is so locked the contacts 168 and 169 of the interlock are disengaged. Engagement of these contacts 168 and 169 is essential to completion of the motor circuit for the motor 47 and these contacts 168 and 169 are engaged only when the traveling platform is mechanically locked against movement. The jack on the carriage is so constructed, organized, driven and controlled that successive reverse manipulations of the controller 71 causes operation of the electric motor 63 over such period as to result in alternate raising and lowering of the lift members of the jack.

Sections of the wires through which the current for the motors 47 and 63 is transmitted are embodied in cables 295 trained around rollers or spools 296 and round on reels 297 and mounted on the carriage and wound up by springs (not shown) to tension the cables and yet permit them to reel out when the carriage moves off of the traveling platform.

Suitable collectors or contact shoes are mounted on the traveling platform and coact with the rails or wires on the trackway 10 for conveying the current to the terminal board.

Although the traveling platform is always substantially alined with the selected stall or elevator it is difficult to obtain exact alinement in all instances and for the purpose of obtaining a final and substantially exact alinement between the carriage and the selected stall or elevator the carriage is provided with a set of guides 300. Each set of guides includes a pair of guide members, each of which has a substantially straight central portion 302, and outwardly inclined end portions 303, the end portions 303 providing outwardly diverging wings. These guides are designed to coact with vertical guide rollers 304 provided on the traveling platform. It is to be noted that the wheels which support the carriage are relatively broad and are flanged at their inner margins only. When the carriage begins to move off the platform one or the other of the wings coact with the guide rollers 304 of the platform to center the carriage on the platform. Then as the carriage moves off of the platform its wheels are positioned to engage the bent or curved ends of the rails of the compartment or elevator. In this way such final matching or final alinement as is essential is insured.

When the invention is embodied in an apparatus for storing and handling vehicles, vehicles are run into the receiving station which the ground floor of the building provides and are loaded on the elevators and carried to the floor on which they are to be stored. On each floor there is a traveling platform equipped with a carriage and jack for transporting the automobiles to and from the elevator and stalls. The traveling platform is lined up with the elevator which brings the car to the floor and when so lined up the carriage is run off of the platform onto the elevator and when properly positioned under the automobile the jack of the carriage is elevated into engagement with the front axle of the automobile. The carriage is then run back onto the traveling platform and in this way the automobile is taken from the elevator onto the traveling platform. With the automobile properly positioned on the traveling platform the platform is run down the aisle until it is alined with the selected stall whereupon the carriage is run off into the stall to carry the automobile thereinto. With the automobile properly located in the stall the jack is lowered and the carriage with the lowered jack is returned onto the platform. These operations being partly automatic may be carried out with a great deal of expedition so as to speed up the handling of the automobiles. The automatic features while speeding up the operation in this way also operate as safety features as hereinabove pointed out.

The invention claimed is:

1. An apparatus for storing and handling vehicles in a building having a plurality of floors, each floor having a trackway and a row of stalls on each side of the trackway and an elevator carrying the vehicles from the ground level to any floor, and comprising a transfer platform running back and forth on the trackway on each floor, and a carriage on each transfer platform, said carriage having means adapted to engage an automobile to cause the automobile to move with the carriage, the carriage being adapted to run off of the transfer platform and into the stalls or onto the elevator, and interlocking controls for the carriage and transfer platform.

2. An apparatus for storing and handling vehicles in a building having a trackway and a roll of stalls along the trackway and comprising a transfer platform movable back and forth along the trackway, a motor for driving said transfer platform, a controller for said motor, and means for causing the transfer platform to stop automatically in front of any selected stall, and comprising a track abutment for each stall, an adjustable trip mounted on the transfer platform and connected with the motor controller, said trip being adjusted to engage the track abutment of the selected stall and being moved when engaged with said track abutment to shift the controller to cause the motor to stop, said track abutments having offset portions operable to so shift the trip as to first cause the transfer platform to slow up and then cause it to stop.

3. An apparatus for storing and handling vehicles in a building having a trackway and stalls along the trackway and comprising a transfer platform movable along the trackway, an electric motor for driving said transfer platform, a carriage mounted on the platform and movable across the platform and into and out of the stalls, said carriage having means for engaging a vehicle to cause the vehicle to move with the carriage, an electric motor for driving the carriage, circuits for said motors, a lock for securing the transfer platform in alinement with a selected stall, switches incorporated in said circuits and controlled by said lock for preventing operation of the motor for driving the carriage except when said lock is operative and for preventing operation of the motor for driving the platform except when the lock is released, and a limit switch arrangement embodied in said circuits and controlled by the carriage for breaking the circuit through the motor of the platform except when the carriage is centered thereon.

4. An apparatus for storing and handling vehicles in a building having a trackway and stalls along the trackway and comprising a transfer platform movable along the trackway, an electric motor for driving said transfer platform, a carriage mounted on the platform and movable across the platform and into and out of the stalls, said carriage having means for engaging a vehicle to cause the vehicle to move with the carriage, an electric motor for driving the carriage, circuits for said motors, a lock for securing the transfer platform in alinement with a selected stall, switches incorporated in said circuits and controlled by said lock for preventing operation of the motor for driving the carriage except when the lock is operative and for preventing operation of the motor for driving the platform except when the lock is released.

5. In combination, a traveling bridge, a wheeled transfer carriage supported on the bridge and movable transversely thereof, an electric motor for driving the transfer carriage, said transfer carriage having means adapted to engage a vehicle to cause the vehicle to move with the carriage, a circuit for the motor of the transfer carriage, a controller incorporated in said circuit, a limit switch incorporated in said circuit for automatically breaking the same when the carriage returns to proper position on the platform, and a push button switch for short circuiting of the limit switch to permit the transfer carriage to be moved off of the platform.

6. An apparatus for handling and storing vehicles in a building having a main trackway and stalls along the main trackway and comprising a motor driven transfer platform on which vehicles are adapted to be deposited, said transfer platform being movable along the main trackway, vehicle wheel receiving runways extending transversely of the transfer platform, a transverse trackway on the platform located in between the vehicle wheel receiving runways, each of said stalls having vehicle wheel receiving runways and a trackway located in between its runways, a motor driven carriage movable back and forth across the trackway of the platform and onto and off of the trackway of any stall with which the platform is alined, said carriage being adapted to be run into position beneath a vehicle to be handled or stored and having a vertically adjustable vehicle engaging element acting when elevated to provide a propelling connection between the carriage and the vehicle so that the carriage when moved with the vehicle engaging element elevated and engaged with the vehicle, propels the vehicle on its own wheels along said runways.

7. An apparatus for handling and storing vehicles in a building having a main trackway and stalls along the main trackway and comprising a motor driven transfer platform on which vehicles are adapted to be deposited, said transfer platform being movable along the main trackway, vehicle wheel receiving runways extending transversely of the transfer platform, a transverse trackway on the platform located in between the vehicle wheel receiving runways, each of said stalls having vehicle wheel receiving runways and a trackway located in between its runways, a motor driven carriage movable back and forth across the trackway of the platform and onto and off of the trackway of any stall with which the platform is alined, said carriage being adapted to be run into position beneath a vehicle to be handled or stored and having a vertically adjustable vehicle engaging element acting when elevated to provide a propelling connection between the carriage and the vehicle so that the carriage when moved with the vehicle engaging element elevated and engaged with the vehicle, propels the vehicle on its own wheels along said runways, a motor geared to said vehicle engaging element for raising and lowering the same and controllers for all of said motors located at a single control station on said platform.

8. An apparatus for storing and handling vehicles in a building having a trackway and stalls along the trackway and comprising a transfer platform movable along the trackway, an electric motor for driving said transfer platform, a carriage mounted on the platform and movable across the platform and into and out of the stalls, said carriage having means for engaging a vehicle to cause the vehicle to move with the carriage, an electric motor for driving the carriage, circuits for said motors, and a limit switch arrangement embodied in said circuits and controlled by the carriage for breaking the circuit through the motor of the platform except when the carriage is centered thereon.

9. In a garage, a storage floor having a vehicle inlet, a passageway adjacent said inlet, a plurality of storage compartments adjacent said passageway, a truck, a movable carrier mounted on said truck, propelling means for moving said carrier under a vehicle in said inlet, elevating means on said carrier for engaging an end of a vehicle to raise one end of the same, means for reversing said carrier propelling means to return said carrier with the vehicle to said truck, means for moving said truck to a selected compartment, said carrier propelling means also providing for movement of the carrier and vehicle to the selected compartment and said elevating means providing for lowering the vehicle into place in the selected compartment, and means on the truck and in said inlet and storage compartments for guiding said carrier on its movement.

10. In a garage an inlet for a motor vehicle, a carrier mounted adjacent said inlet, a storage compartment adjacent said carrier, means for moving said carrier underneath a vehicle positioned in said inlet, elevating means on said carrier for elevating an end of said vehicle, means for thereafter moving the same into said storage compartment, and means for guiding said carrier and the unraised end of said vehicle into said inlet and into said storage compartment.

11. In a garage for storing vehicles, the combination of an inlet for said vehicles, a plurality of storage compartments, a transfer table movable adjacent said compartments, means for propelling said transfer table, a carrier on the transfer table, vertically movable supports on the carrier for engagement with an end of a vehicle, mechanism for raising and lowering said supports, means for propelling said carrier to pull the vehicle engaged thereby and means on the transfer table and in the inlet and storage compartments for guiding said carrier in its movement.

12. In a garage for storing vehicles, the combination of an inlet for said vehicles, a storage compartment, a transfer table movable adjacent said compartment, a carrier on said transfer table movable from the latter to an inlet, said carrier being also movable to a selected storage compartment, an electric motor for driving said carrier, automatic means for breaking the circuit to said motor when the carrier is properly positioned in the storage compartment, and automatic means for breaking the circuit to said motor when the carrier is properly positioned in the inlet.

13. In a garage for storing vehicles, the combination of an inlet for said vehicles, a plurality of storage compartments, a transfer table movable adjacent said compartments, an electric motor for propelling said transfer table, and means for automatically stopping the transfer table at a predetermined storage compartment, said means comprising a switch in connection with said motor and slidable along the transfer table, means for sliding said switch, and a plurality of stops, one for each storage compartment, arranged in staggered relation, for engagement with the switch to trip the same.

14. In a garage for storing vehicles, the combination of an inlet for said vehicles, vehicle receiving means, a transfer table movable adjacent said vehicle receiving means, a carrier on said transfer table for moving a vehicle from said transfer table to said vehicle receiving means, an electric motor for driving said carrier, and automatic means for breaking the circuit to said motor when the carrier is properly positioned in the vehicle receiving means.

ARTHUR G. HENRICKS.